W. C. Burch,
Hand Drill,
№ 78,183.   Patented May 26, 1868.

Witnesses:
S. N. Piper
Laurity N. Möller

Inventor:
William C. Burch
by his attorney
R. H. Eddy

United States Patent Office.

WILLIAM C. BURCH, OF GLOUCESTER, NEW JERSEY.

Letters Patent No. 78,183, dated May 26, 1868.

IMPROVED HAND-DRILL.

The Schedule referred to in these Letters Patent and making part of the same.

TO ALL PERSONS TO WHOM THESE PRESENTS MAY COME:

Be it known that I, WILLIAM C. BURCH, of Gloucester, in the county of Camden, and State of New Jersey, have made a new and useful invention, having reference to Hand-Drills, or what are termed Drill-Stocks, &c.; and I do hereby declare the same to be fully described in the following specification, and represented in the accompanying drawings, of which—

Figure 1:
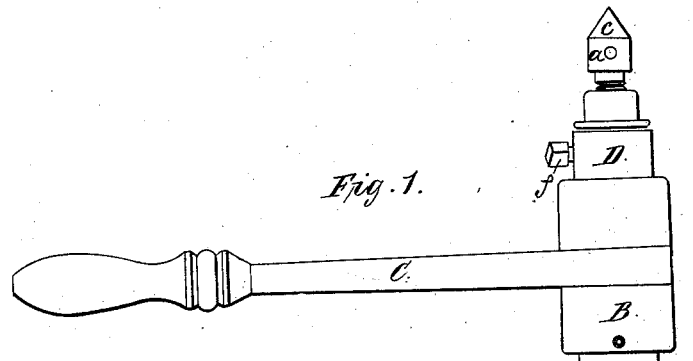

Figure 1 is a side elevation, and

Figure 2:
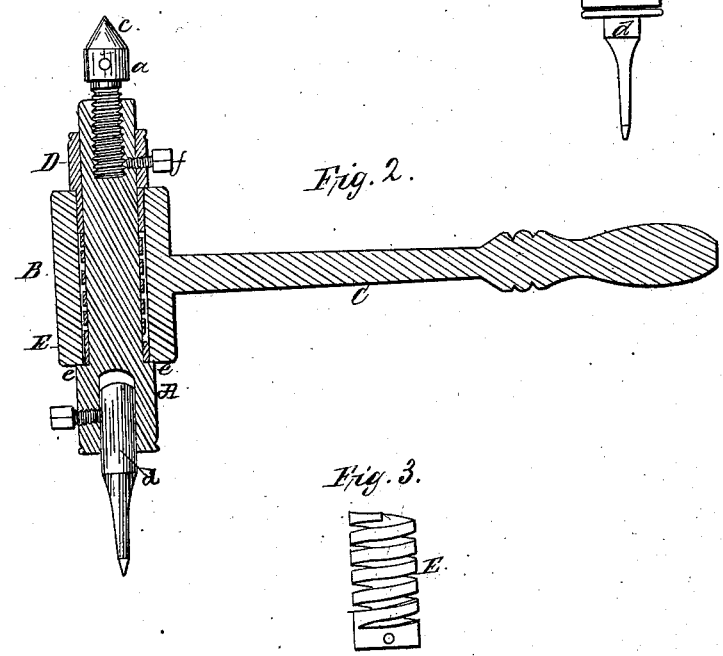

Figure 2 a vertical section of a hand-drill provided with my improvement.

Figure 3:

Figure 3 is a side view of its helical brake.

It is well known that the shank or shaft of a hand-drill, when in use, is usually revolved by a hand-lever carrying one or more pawls to act against a ratchet fixed to the said shaft.

I dispense with such pawl and ratchet, and employ a helical brake in lieu thereof, whereby I am enabled to attain certain important advantages: first, I save the usual noise of the pawl produced by its slipping over the teeth of the ratchet; second, I avoid back slip of the lever, and bring gradually upon the drill and its shaft the strain of the force applied through the lever to revolve the shaft. I thereby render the drill less liable to be broken, and I also save the wrist and hand of the user from the effects of jars or concussions due to sudden stoppage of the lever, such resulting in the bringing up of a pawl against the teeth of a ratchet, when such lever is used with a pawl and ratchet.

In the drawings, A denotes the drill-shaft, carrying a drill, $d$, at its lower end, and having a feeding-screw, $a$, screwed into its other or upper end, such feeding-screw being provided with a conical pivot, $c$.

This shaft goes axially through a cylinder or tubular head, B, from whose middle a handle or lever, C, is extended. The said head rests on a shoulder, $e$, formed on the shaft, and where the shaft projects above the upper end of the head, it is encompassed by a ring or collar, D, held to it by a set-screw, $f$.

Within the bore of the head B is a helix or helical spring or brake, E, which encompasses the drill-shaft and fits to it. At its lower end or part the said brake is connected with the head so as to revolve with it, the connection being by means of a pin, $g$, going into the head and lower part of the brake.

By imparting to the lever a reciprocating motion, so as to turn the head part back and next forward, the helical brake will be moved with the head and about the drill-shaft, while the head may be in the act of being turned back, but while the head may be in the act of being turned forward, the helical brake will be drawn and contracted upon the shaft, and will hold it so tightly as to cause it to revolve forward with the head, and thus turn the drill.

I claim the combination and arrangement of the helical brake with the drill-shaft and the head of the operative lever, the whole being to operate substantially as described.

WILLIAM C. BURCH.

Witnesses:
HENRY FOWLER,
WILLIAM AMES.